No. 874,172.

PATENTED DEC. 17, 1907.

O. DUCKER.
EYEGLASS CASE.
APPLICATION FILED OCT. 2, 1906.

Witnesses
C. H. Walker,
J. T. Walker.

Inventor,
Orlando Ducker

UNITED STATES PATENT OFFICE.

ORLANDO DUCKER, OF WASHINGTON, DISTRICT OF COLUMBIA.

EYEGLASS-CASE.

No. 874,172.  Specification of Letters Patent.  Patented Dec. 17, 1907.

Application filed October 2, 1906. Serial No. 337,128.

*To all whom it may concern:*

Be it known that I, ORLANDO DUCKER, a citizen of the United States, residing at the city of Washington, District of Columbia, have invented a new and useful Improvement in Eyeglass-Cases, of which the following is a specification.

My invention relates to improvement in eyeglass cases wherein a guard plate having a central elevation and extended ends on a line with each other, is made to apply to and fit in and along the side of an ordinary flexible eyeglass case provided with an opening in the side, and which will receive, protect and retain the projecting nose guards on many eyeglass frames now in use, and impart strength and prevent undue flection of the said case, thus obviating the thick and clumsy metal cases now in use for eyeglasses having projecting nose guards.

Figure 1:
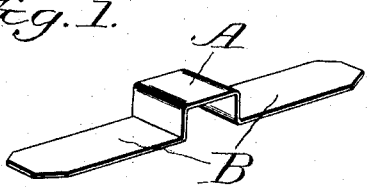
Figure 2:
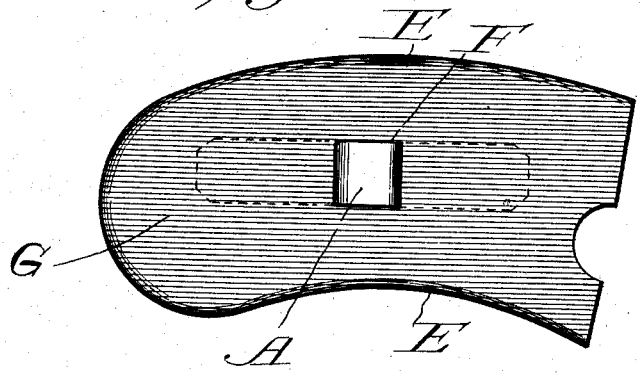
Figure 3:
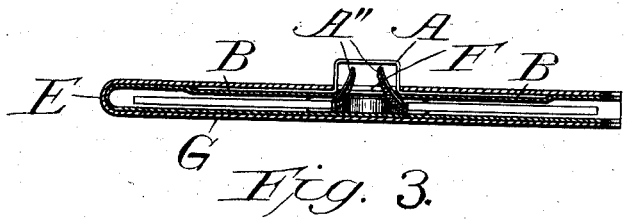

In the drawings Figure 1, is a perspective view of the guard plate. Fig. 2, shows the guard plate applied to an eyeglass case. Fig. 3, is a view of a longitudinal section of Fig. 2, and shows the eyeglasses in position in the case.

The guard plate can be made of any suitable thin, and narrow material, thin metal preferably, and should equal in width the length of the projecting nose guards on the ordinary eyeglass frames and be long enough to allow at or near the center the formation of a semi-circular or square elevation of sufficient height to receive the projecting nose guards on eyeglasses, as shown at A, Fig. 1, and the ends B, B, of sufficient length to allow them to be securely attached along the longitudinal center of the side of a flexible eyeglass case, provided with a central opening to admit the elevation A, on the guard plate as shown in Figs. 2 and 3. Any ordinary flexible eyeglass case thus provided with my invention will effectually receive, retain and protect eyeglasses having projecting nose guards and the plate will impart great strength and prevent undue flection of otherwise a thin flat flexible case thereby affording greater security to eyeglasses which may be contained therein and at the same time occupying the least possible space consistent with strength and durability.

The guard plate may be made not only by pressing or bending the material used, into the desired shape or form as shown in Fig. 1 but may be made so that the open sides of the elevation A, will be closed, by having the material used for making the guard plate, broader at A, which would cause the sides to A, to be closed by reason of the material being broader than the pressure surface forming the elevation A, but all such modifications are unnecessary and absolutely useless, for the closed edges E, E, of the case F, as shown in Fig. 2, will prevent the eyeglasses when in the case from moving laterally to any appreciable degree, thereby preventing the nose guards from projecting beyond the ends of the elevation A, when the guard plate is in proper position in the eyeglass case.

In making new eyeglass cases having my improvement, the ordinary material used for making flat flexible cases is prepared in the usual manner, an opening is then made in one of the opposing sides at or near its center, the elevation A, of the guard plate as shown in Fig. 1, is inserted into said opening, the extended ends B, B, placed in proximity to the longitudinal center of the inner surface of said side and secured in position by pasting any suitable material over and under it, the case is then finished in the usual manner; care should be observed not to have the extended ends B, B, broad enough to prevent the necessary convex flection of the sides of the case to admit eyeglasses having projecting nose guards, when the edges E, E, are pressed towards each other.

Eyeglasses having projecting nose guards may be introduced in an eyeglass case provided with my invention, by slightly pressing towards each other the edges E, E, which will cause the flat sides of the case to separate sufficiently to admit said eyeglasses and the nose guards to enter the elevation A, as shown in Fig. 3. The eyeglasses may be withdrawn in like manner as introduced.

I am aware that many cases are now in use, having for their object the reception and protection of eyeglasses having projecting nose guards, but I am not aware any improvement has ever been used or invented similar to the one herein described.

What I claim as new is;

A guard plate for flexible eyeglass cases comprising an elongated strip of less width than the width of the case, said strip being formed with an offset portion arranged to be projected through and form a housing for an opening in the case.

ORLANDO DUCKER.

Witnesses:
A. O'NEILL,
A. M. SPOFFORD.